United States Patent [19]

Koury

[11] Patent Number: 5,138,325
[45] Date of Patent: Aug. 11, 1992

[54] SHIPBOARD SENSOR EXERCISER APPARATUS

[75] Inventor: William J. Koury, Beltsville, Md.

[73] Assignee: The United States of America as represented by the Secretary of the Navy, Washington, D.C.

[21] Appl. No.: 481,180

[22] Filed: Apr. 1, 1983

[51] Int. Cl.⁵ .......................... G01S 7/40; G09B 9/00
[52] U.S. Cl. ..................... 342/169; 342/172; 342/174; 434/2
[58] Field of Search ............ 343/17.7; 434/2; 342/165, 169, 170, 171, 172, 173, 174

[56] References Cited

U.S. PATENT DOCUMENTS

| | | | |
|---|---|---|---|
| 3,130,405 | 4/1964 | Kelly, Jr. | 342/166 |
| 3,160,882 | 12/1964 | Stimler et al. | 342/172 |
| 3,172,105 | 3/1965 | Schwab | 342/172 |
| 3,327,042 | 6/1967 | Pollack | 434/2 |
| 3,471,855 | 10/1969 | Thompson | 342/165 |
| 3,573,339 | 4/1971 | Flower et a. | 434/2 |
| 4,070,769 | 1/1978 | Hollis | 434/2 |
| 4,085,524 | 4/1978 | Meyer | 434/2 |
| 4,121,213 | 10/1979 | Bush et al. | 342/172 |
| 4,329,688 | 5/1982 | Goldie | 342/168 |
| 4,334,866 | 6/1982 | Burrows | 342/169 |
| 4,450,447 | 5/1984 | Zebker et al. | 342/171 |
| 4,477,811 | 10/1984 | Collins, IV | 342/173 |

Primary Examiner—John B. Sotomayor
Attorney, Agent, or Firm—Kenneth E. Walden; John G. Wynn

[57] ABSTRACT

A simulated burst echo signal (artificial target), corresponding to a delayed and conditioned version of an RF burst signal from an associated radar under test, is presented to the associated radar under test by coupling a portion of the RF burst signal into a shipboard sensor exerciser apparatus in which the present invention is employed to feed an attenuated facsimile of the RF burst signal into a phase-locked loop portion thereof. The phase-locked loop locks on to the attenuated facsimile of the RF burst signal and generates an error signal in response thereto. The error signal is then digitized and stored in an error storage unit portion where it is delayed for a predetermined time associated with the desired selected range of the artificial target. After this appropriate delay time, a target processor portion of the shipboard sensor exerciser apparatus, in coaction with a system control logic, causes the error storage unit to dump through a digital-to-analog converter portion thereby reconstructing the error signal but delayed by the aforementioned predetermined time. The reconstructed error signal is used to drive a voltage controlled oscillator portion of the phase-locked loop in an open-loop mode of operation. The output from the voltage controlled oscillator, in this mode, is sent to an indicator of the associated radar under test via a programmable attenuated which is controlled by the target processor. The programmable attenuator makes it possible to change, inter alia, the power level and the cross section of the artificial target created.

5 Claims, 2 Drawing Sheets

SHIPBOARD SENSOR EXERCISER APPARATUS

BACKGROUND OF THE INVENTION

1. Field of the Invention

The present invention relates to an apparatus for creating an artificial target for presentation to an associated radar system under test, but more specifically, it relates to a shipboard sensor exerciser apparatus wherein target senario parameters such as range, radar cross section, azimuth, velocity, and elevation are under manual control of an operator.

2. Description of the Prior Art

A number of different systems can be found in the prior art which met the requirement of producing a return signal to a radar system under test which simulates an artificial target. For proper system operation in producing the artificial target, the return signal must be an appropriately attenuated delayed and possibly phase shifted version of the radar transmitted signal, i.e., the RF burst signal. Prior art systems have been designed to meet the foregoing requirements, but not without attendant problems.

In the prior art, one technique for creating delays in RF signals is by using surface acoustic wave delay lines. These type of delay lines can be used to actually delay the RF signal in real time. However, these type of delay lines are unwieldly. For example, to simulate a delay associated with a target ten miles away, a length of line five miles long would be required. Thus, there is a need in the prior art, in the configuring of apparatus for creating an artificial target to be able to create delays in the RF signal in real time, but yet configure the apparatus to have the facility of portability.

Another technique by which RF signals can be delayed is by using a frequency memory loop. As it is known in the prior art, a frequency memory loop comprises a delay line in series with an RF amplifier whose output terminal is tied back to the input terminal of the delay line. In this closed loop configuration, the gain of the RF amplifier is set to just compensate for the losses of the delay line. Hence, an RF signal could be made to circulate in the loop indefinitely before it is routed to an output port. Each time the RF signal circulates once corresponds to a delay time equal to the design delay of the delay line. Theoretically, an indefinite number of circulations would mean an indefinitely long delay time. However, in practice, there are limitations to the number of times an RF signal can be circulated and still maintain spectral purity, i.e., not be corrupted by signal to noise degradation. Because of the foregoing, the frequency memory loop has a practical maximum delay value of only around 15 microseconds, which corresponds to a simulated target range of only 7,500 feet. In actual practice, simulated target ranges are usually in the order of 10 miles to hundreds of miles. Consequently, there is a need in the prior art to simulate target ranges in the order of 10 miles to hundreds of miles while maintaining signal to noise integrity of the RF signal.

Still another technique involves frequency translating the RF signal down to a convenient intermediate frequency and then using an intermediate frequency delay line to create the desired delay. A final step would be frequency translating the delayed intermediate frequency signal back to the RF range to produce a delayed RF signal. The problems with this technique are similar to those associated with the techniques previously mentioned plus the added problems of increased costs and decreased reliability which are both related to the increased circuitry involved. Hence, there is a need in the prior art to create desired delays in the RF signal while lowering system costs and increasing system reliability.

The prior art, as indicated hereinabove, disclose what could be called advances in radar target simulators. However, insofar as can be determined, no prior art radar target simulator apparatus incorporates all of the features and advantages of the present invention.

OBJECTS OF THE INVENTION

Accordingly, a principal object of the present invention is to accurately simulate radar targets corresponding to a wide variety of target senarios and be able to inject the simulated target close to the antenna of the associated radar under test so as to test all of the important components of the radar system.

Another object of the present invention is to configure the apparatus for creating the simulated target to operate with most of the existing radar systems but yet have the facility of portability.

Yet another object of the present invention is to create simulated targets corresponding to the range of 10 miles to hundreds of miles while maintaining signal to noise integrity of the RF signal.

Still another object of the present invention is to create desired delays in the RF signal corresponding to the RF burst signal of the associated radar under test while lowering system costs and increasing system reliability.

SUMMARY OF THE INVENTION

In accordance with the above stated objects, other objects, features and advantages, the present invention has as a primary purpose to simulate radar targets for most of the existing radar systems and to inject the RF signal corresponding thereto as close to the antenna of the radar system under test as practicable so as to test all of the component parts thereof.

The essence of the present invention is in the use of a phase-locked loop in combination, inter alia, with an error storage unit to generate an error signal from an incoming RF burst signal. The error signal is digitized and stored in the error storage unit thus providing the means for creating the aforementioned desired delays in the RF signal. Using a phase-locked loop, inter alia, eliminates the need for down converting the incoming RF burst signal because the error signal is, in effect, the result of a frequency conversion, but not to a particular intermediate frequency but to DC or zero frequency. Hence, a powerful advantage is that different plug-in phase-locked loop modules centered at different frequencies for different radar systems all will produce, when locked-up, an error that a single mainframe can process, store, and recall.

The purpose of the present invention is carried out by presenting an artificial target to and associated radar under test by allowing a portion of RF the transmitter burst, i.e., RF signal, via a dual coupler/duplexer, to be fed into the phase-locked loop. As previously mentioned, the phase-locked loop locks onto the RF signal and generates an error signal which is digitized and stored in the error storage unit. After an appropriate delay associated with the selected range of the artificial target, an echo-request command is outputted from a target processor. This action causes the error storage unit to dump through a digital-to-analog converter thereby reconstructing the prior error signal into a delayed loop error signal. This delayed reconstructed error signal then drives a voltage controlled oscillator in an opened loop mode. The output from the voltage controlled oscillator, in this mode, drives the aforementioned dual directional coupler/duplexer, via a programmable attenuator which is controlled by the target processor. The programmable attenuator makes it possible to dynamicaly change the lower level of the artificial target as the range or cross-section of the artificial target is changed.

BRIEF DESCRIPTION OF THE DRAWINGS

The previously stated objects, other objects, features and advantages of the present invention will be apparent from the following more particular description of a preferred embodiment as illustrated in the accompanying drawings, in which.

DESCRIPTION OF THE PREFERRED EMBODIMENT

Figure 1:
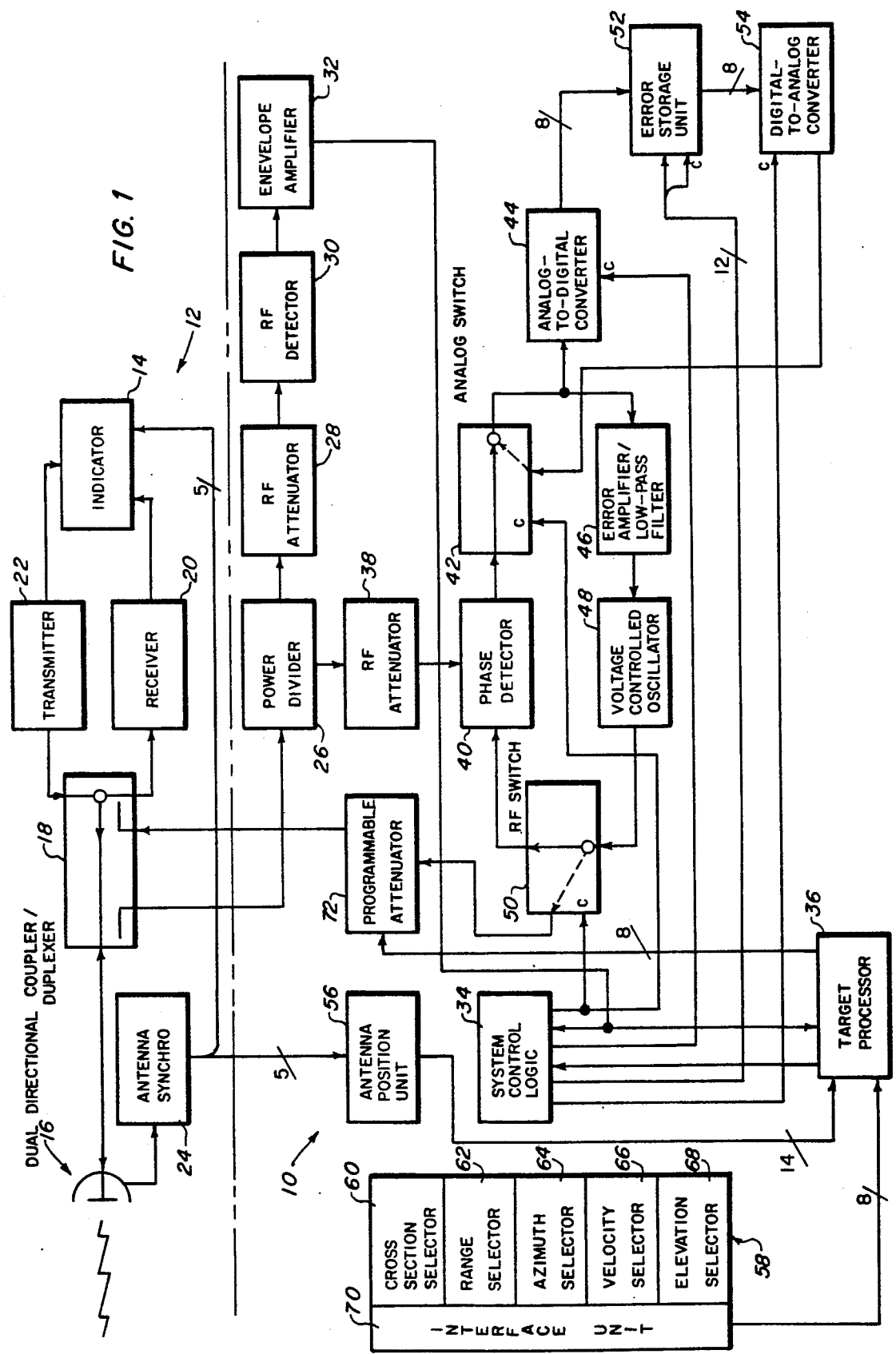
FIG. 1 is a block diagram representation of the shipboard sensor exerciser apparatus, according to the present invention, depicting, inter alia, the particular arrangement of the PLL and the error storage unit for delaying a fascimile of the RF burst signal and for creating a simulated burst echo signal.

FIG. 1 shows a shipboard sensor exercise apparatus 10, below the dotted line, connected to an associated radar under test 12, above the dotted line, according to the present invention. For purposes of the present invention, the associated radar under test 12 comprises an indicator 14 for displaying targets from the associated radar under test 12 and for displaying simulated targets from the shipboard sensor exerciser apparatus 10, an antenna 16 for coupling an RF burst signal into the air and for receiving a returned echo signal, a dual directional coupler/duplexer 18 whereat a portion of the RF burst signal in a first port thereof is tapped off for use in the shipboard sensor exerciser apparatus 10 and for causing coupling via a second port thereof from the shipboard sensor exerciser apparatus 10 of a simulated burst echo signal back into the associated radar under test 12. The associated radar under test 12 further comprises a receiver 20 for receiving, via the duplexer portion of dual directional coupler/duplexer 18, the RF burst echo signal both simulated and actual and processing them for subsequent display on the indicator 14, a transmitter 22 for generating an RF burst signal and feeding it through the duplexer portion and the dual directional coupler portion of the dual directional coupler/duplexer 18 into the antenna 16 and out into the surrounding air, and an antenna synchro 24 for measuring the position of the antenna 16 and sending the position information to both the indicator 14 and the shipboard sensor exerciser apparatus 10.

Still referring to the block diagram representation of FIG. 1, the shipboard sensor exerciser apparatus 10 in which the present invention is employed comprises, inter alia, a power divider 26 which is coupled to the first port of the dual directional coupler/duplexer 18 of the associated radar under test 12 for dividing the transmitted RF burst signal into two outputs. One output of the power divider 26, in a first signal path, drives a first signal path RF attennuator 28 which attenuates the RF burst signal thereat to a predetermined level suitable for use in an RF detector 30 coupled thereto. The output of the RF detector 30 drives an envelope amplifier 32. For purposes of the present invention, the RF detector 30 is a square-law type device which detects the presence of RF energy and generates a voltage that is proportional to the amount of power that is coupled into its input. The envelope amplifier 32 amplifies the aforementioned proportional voltage to a specific logic level output for driving a system control logic 34 and a target processor 36. The system control logic 34 and the target processor 36 will be discussed in more detail hereinafter.

To continue, the power divider 26 also drives, in a second signal path, a second signal path RF attenuator 38 for attenuating the RF burst signal thereat to a predetermined level suitable for driving one input of a phase detector 40. The output of the phase detector 40 feds one input of an analog switch 42 shown in the solid line signal path in a closed loop mode. The analog switch 42, in turn, drives one input of an analog-to-digital converter 44 and the input of an error amplifier/low-pass filter 46. The analog-to-digital converter 44 converts the analog signal, i.e., error signal, from the analog switch 42 into an eight bit digital word. The error amplifier/low-pass filter 46 conditions the error signal, to have certain loop characteristics for proper lock-up of the RF burst signal. The error amplifier/low-pass filter 46 drives a voltage controlled oscillator 48 whose output is fed to an RF switch 50. The RF switch 50 directs the signal in the a solid line signal path to the other input of the phase detector 40. As shown, the phase detector 40, the analog switch 42, the error amplifier/low-pass filter 46, the voltage controlled oscillator 48 and the RF switch 50 form a phase-locked loop. The solid line signal path through the loop, including the solid line paths through the analog switch 42 and the RF switch 50, represent the closed loop mode of operation, i.e., the phase-locked loop is locked. The dotted line paths, in the analog switch 42 and the RF switch 50, represent the opened loop mode of operation of the phase-locked loop. More aspects of the foregoing will be discussed hereinafter in "The Statement of the Operation."

Still referring to the block diagram representation of the shipboard sensor exerciser apparatus 10 of FIG. 1, as aforementioned, the analog-to-digital converter 44 digitizes the error signal from the analog switch 42 and feeds the digital information into an error storage unit 52. The error storage unit 52 is provided eight bit digital words corresponding to the digital version of the error signal. In response to a command signal from the system control logic device 34, the error storage unit 52 can be accessed and loaded with the digital information. When accessed, the error storage unit 52 dumps its digital information into a digital-to-analog converter 54, which also in response to a command signal from the system control logic device 34 converts the digital information from the error storage 52 into a delayed error signal. As shown, this reconstructed delayed error signal, at the command of the system control logic device 34, is fed to the analog switch 42 through the position thereof represented by the dashed line, i.e., the opened loop mode.

Continuing, an antenna position unit 56 is fed analog information from the antenna syncho 24, aforementioned, in the form of five (5) synchro lines. The antenna position unit 56 converts this analog information into digital words representative of the position of the antenna 16 of the associated radar under test 12. The output of antenna position unit 56, via a fourteen (14) line bus, is presented to the target processor 36 for further processing. A target senario device 58, including a cross section selector 60, a range selector 62, an azimuth selector 64, a velocity selector 66, an elevation selector 68 and an interface unit 70, allows an operator to input specific simulated target senario information to the target processor 36. The interface unit 70 takes information from the various selectors (in the form of keypad inputs for example) and converts it into a communicable form for use by the target processor 36. The specific simulated target senario information affecting the amplitude of the simulated echo burst signal is processed in the target processor 36 and fed, via an eight (8) line bus to a programmable attentuator 72. The eight bit digital words formed set the value of attenuation such that the programmable attenuator 72 can take into account differences in target cross section, target range, and also the transmit power, for example, of the associated radar under test 12. The RF switch 50, at the command of the system control logic device 34, when switched into the dashed line position, i.e., the opened loop mode, also feeds the simulated burst echo signal to the programmable attenuator 72.

STATEMENT OF OPERATION

Figure 2:
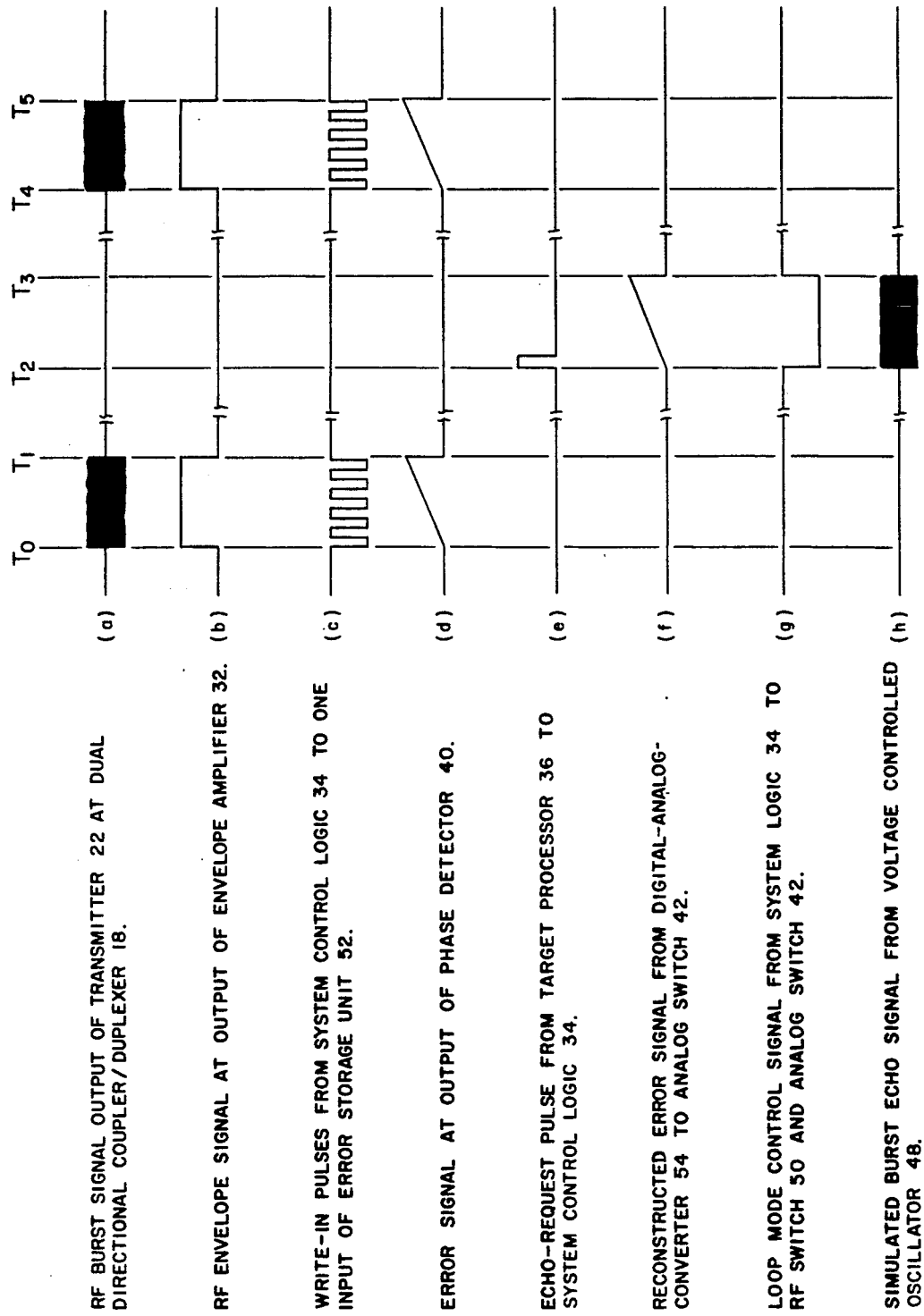
FIG. 2 is a timing/waveform diagram illustrating the sequential/concurrent inter-relationship of various waveforms, including the RF burst signal and the simulated burst echo signal, as measured at the interfaces of various elements of the shipboard sensor exerciser apparatus of FIG. 1 during the operation thereof.

Details of the operation, according to the preferred embodiment of the present invention, are explained in conjunction with FIGS. 1 and 2 as viewed concurrently.

The system control logic 34 takes input signals in the form of an RF envelope signal from the envelope amplifier 32 and an echo-request pulse from the target processor 36. In response to the foregoing signals, the system control logic 34 outputs commands in the form of various control pulses (for example see FIG. 2c) to the analog switch 42, the analog-to-digital converter 44, the RF switch 50, the error storage unit 52 and the digital-to-analog converter 54. The system control logic 34, via a twelve (12) line bus, instructs the error storage unit 52 either to write information in from the analog-to-digital converter 44 or to read information out to the digital-to-analog converter 54. The writing action takes place during the closed-loop mode of operation and the reading action takes place during the opened-loop mode of operation. For purposes of the present invention, eleven (11) of the twelve (12) lines feeding the error storage unit 52 are dedicated to accessing 2,048 different storage positions therein. The other line, i.e., the line represented by the letter c, is a control line which, depending upon the signal thereon, will cause the error storage unit 52 to read or write information, as discussed previously.

To continue, the analog-to-digital converter 44 also receives a control signal from the system control logic 34. This control signal (not shown) is in the form of a convert pulse comprising a 20 MHz clock. The RF switch 50 receives a loop mode control signal. The presence of the loop mode control signal causes the aforementioned switches 42 and 50 to switch into the position shown by the dashed lines. This corresponds to opened-loop mode operation. Consequently, closed-loop mode operation corresponds to the solid line position of the switches 42 and 50.

For purposes of the present invention, the functions of target processor 36 can be performed by an INTEL 8085 microprocessor, or similar device, and the necessary input/output devices, latches and associated memories for proper operation thereof.

Still referring to FIGS. 1 and 2 as viewed concurrently, but principally to the timing/waveform diagram of FIG. 2, the associated radar under test 12 outputs an RF burst signal from the transmitter 22 thereof. The initial RF burst signal occurs between the times $T_0$-$T_1$, as shown in FIG. 2a. This signal progresses toward the antenna 16 via the dual directional coupler/duplexer 18 whereat the power divider 26 couples-out a portion of the signal and feeds it, after an attenuation process and a detection process into the envelope amplifier 32 along the first signal path. The envelope amplifier 32 processes the signal (voltage), during the time period $T_0$-$T_1$, into a logic drive signal, i.e., the RF envelope signal shown in FIG. 2b. This signal operates as a synchronizing pulse for the system control logic 34 and the target processor 36. During this same period of time $T_0$-$T_1$, the proper power level to the phase detector 40 is set via the second signal path and the RF attenuator 38. Once the signal enters the phase detector 40, the phase locked loop will be set for the closed-loop mode of operation, as depicted by the up level of the loop loop mode control signal of FIG. 2g. Setting of the loop occurs at time $T_0$, i.e., the loop locks-up and an error signal will start to be generated as shown in FIG. 2d. The error signal shown is for the particular case of a chirped radar, i.e., the frequency of the RF burst signal is linearly changing from time $T_0$ to time $T_1$ for example. At this point in time, the loop is locked-up and the error signal, aforementioned, is being generated. In this same time period, the signal passes through the analog switch 42, in the position shown, and is applied to the input of the analog-to-digital converter 44. The analog-to-digital converter 44 converts the error signal into a digital format and storages the digital word generated into the error storage unit 52. At time $T_1$, the RF burst signal ends, and, accordingly, the RF signal presented to the phase-locked loop will also end and the RF envelope signal in FIG. 2b will go to a down level. After a predetermined delay period corresponding to a desired range for the artificial target under simulation, an echo-request pulse, as shown in FIG. 2e, is generated from the target processor 36 and applied to the system control logic 34.

The error storage unit 52 is given its command to either write or read the information presented to it with the write-in pulses shown in FIG. 2c. The logic "one" or high level between the times $T_1$-$T_4$ represents the read condition, and the write condition is represented by the series of pulses shown between times $T_0$-$T_1$, and $T_4$-$T_5$. The actual number of write-in pulses is much greater than that shown. But for purposes of clarity, only a few of the write-in pulses are depicted. As shown in FIG. 2e, the echo-request pulse at a time $T_2$ causes several system events to take place. One event, in response to the presence of the echo-request pulse is the error storage unit 52 dumping its digital information into the digital-to-analog converter 54. This causes the subsequent outputting of a reconstructed error signal as shown in FIG. 2f. The reconstructed error signal is routed through the analog switch 42, as depicted by the dashed line position thereof, and fed to both the analog-to-digital converter 44 and the error amplifier/low-pass filter 46. It is amplified to produce, between the times T₂–T₃, a delayed replication, of the error signal of FIG. 2d.

As shown in FIG. 2g, the loop mode control signal from the system control logic 34 at the time T₂ changes from the closed-loop mode to the opened loop mode, i.e., from an up level to a down level. This causes the output of the digital-to-analog converter 54 to be switched through the analog switch 42 in the dashed position. Also, at the same time, the RF switch 50 is switched over to the dashed position. The output signal of the digital-to-analog converter passes through the analog switch 42 to the error amplifier/low-pass filter 46. This output, in turn, drives the voltage controlled oscillator 48 whose output feds through the RF switch 50, in the dashed position, into the programmable attenuator 72. The programmable attenuator 72 proportions the amplitude of this simulated burst echo signal, from the voltage controlled oscillator 48, as shown in FIG. 2h. The amplitude is proportioned as desired, and depends on the required target size or cross section, target range, and, also, the power of the transmitter 22 of the associated radar under test 12. This programming is accomplished via eight (8) control lines from the target processor 36, as shown in FIG. 1. The output of the programmable attenuator 72 is fed into the dual directional coupler/duplexer 18. At this point, the simulated burst echo signal is coupled into the receiver 20 and displayed on the indicator 14 as an artificial target. FIG. 2h depicts the aforementioned simulated burst echo signal from the voltage controlled oscillator 48. As shown, this signal appears between the times T₂–T₃ immediately after the echo-request pulse of FIG. 2e has been generated. The simulated burst echo signal appears during the opened-loop mode for purposes of being injected into the receiver 20.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A shipboard sensor exerciser apparatus for creating a desired artificial target for presentation to an associated radar under test, said associated radar under test having an indicator for displaying an actual target and the desired artificial target, an antenna for coupling an RF burst signal out and for coupling returned echo signals in, a transmitter for generating the RF burst signal, a receiver for receiving the actual target and the desired artificial target, a dual directional coupler/duplexer operatively connected between said antenna, said transmitter and receiver, and said shipboard sensor exerciser apparatus for directing the outgoing RF burst signal from said transmitter to said antenna, for directing the incoming actual target from said antenna and the desired artificial target from said shipboard sensor exerciser apparatus into said receiver, said dual directional coupler/duplexer having a first port for tapping off a portion of the RF burst signal for use in said shipboard sensor exerciser apparatus and a second port for coupling of the desired artificial target from said shipboard exerciser apparatus to said receiver, and said associated radar under test further having an antenna synchro connected at its input to said antenna and at its output to said indicator and to said shipboard sensor exerciser apparatus for measuring the position of said antenna and providing position information to said shipboard sensor exerciser apparatus, said shipboard sensor exerciser apparatus comprising:

first means operatively coupled to said dual directional coupler/duplexer for developing, from the portion of the RF burst signal, an RF envelope signal and an attenuated facsimile of the portion of the RF burst signal;

second means operatively connected at one input to the output of said antenna synchro and at the other input to said first means for generating control signals in response to the RF envelope signal and for generating control outputs corresponding to predetermined target senario information which takes into account cross section, range, azimuth, velocity and elevation so as to create the desired artificial target to be compatible with the associated radar under test;

third means operatively connected to said first means and said second means, said third means being configured to operation in a closed-loop mode for generating an error signal in response to the attenuated facsimile of the portion of the RF burst signal, and said third means configured to operate in an opened-loop mode when switched by particular ones of the control pulses from said second means;

fourth means operatively connected to said second means and to said third means for storing the error signal during the closed-loop mode of operation of said third means, and for reconstructing a delayed replication of the error signal in response to other particular ones of the control pulses during the opened-loop mode of operation of said third means; and fifth means operatively connected to said second means, said third means and said second port of said dual directional coupler/duplexer, such that when said third means is operating in the opened-loop mode, the reconstructed and delayed replication of the error signal causes the generation of a simulated burst echo signal which feeds one input of said fifth means, the control outputs from said second means feeding the other input of said fifth means thereby conditioning the simulated burst echo signal into the desired artificial target, the desired artificial target being fed from the output of said fifth means into the second port of said dual directional coupler/duplexer.

2. A shipboard sensor exerciser apparatus according to claim 1 wherein said first means comprises:

a power divider operatively coupled to the first port of said dual directional coupler/duplexer for dividing the portion of the RF burst signal into two outputs along first and second signal paths;

a first signal path RF attenuator connected at its input to one output of said power divider for attenuating the portion of the RF burst signal to a predetermined level;

an RF detector coupled at its input to the output of said first signal path RF attenuator for detecting the presence of the attenuated portion of the RF burst signal and for generating a voltage proportional to the amount of power coupled into its input;

an envelope amplifier operatively connected at its input to the output of said RF detector for amplifying the output thereof to a predetermined logic level, the output of said envelope amplifier being the RF envelope signal; and a second signal path RF attenuator connected at its input to the other output of said power divider for dividing the portion of the RF burst signal into the attenuated facsimile thereof.

3. A shipboard sensor exerciser apparatus according to claim 2 wherein said second means comprises:

a system control logic operatively connected to the output of said envelope amplifier, said third means and said fourth means for outputting commands in the form of the control signals including convert pulses, write-in pulses and a loop mode control signal, the convert pulses being outputted during both the closed-loop and opened-loop modes of operation of said third means, the write-in pulses being generated during the closed-loop mode of operation of said third means, and the loop mode control signal being outputted during the opened-loop mode of operation of said third means in response to the generation of an echo-request pulse;

a target processor having one output operatively connected to said fifth means for feeding the control outputs thereto and another output operatively connected to said system control logic for feeding the echo-request pulse thereto from the other output, said target processor having a first input connected to the output of said envelope amplifier;

an antenna position unit operatively connected at its input to the output of said antenna synchro and at its output to a second input of said target processor for converting analog information from said antenna synchro into digital words for presentation to said target processor; and a target senario device having its output coupled to a third input of said target processor so as to allow an operator to input the predetermined target senario information into said target processor so as to generate the control outputs.

4. A shipboard sensor exerciser apparatus according to claim 3 wherein said third means comprises:

a phase detector operatively connected at one input to the output of said second signal path RF attenuator for generating an error signal in response to the difference in phase between the attenuated facsimile of the portion of the RF burst signal at the one input thereof and a generated closed-loop mode version of the attenuated facsimile of the portion of the RF burst signal at the other input of said phase detector while said third means is operating in the closed-loop mode;

an analog switch operatively connected at a first input to the output of said phase detector, at a second input to said system control logic so as to be switched by the loop mode control signal during the opened-loop mode of operation of said third means, and at a third input to the output of said fourth means, said analog switch operating to pass the error signal to its output when said third means is operating in the closed-loop mode;

an error amplifier/low-pass filter operatively connected at its input to the output of said analog switch for conditioning the error signal for proper lock-up of a simulated burst echo signal to be generated;

a voltage controlled oscillator operatively connected at its input to the output of said error amplifier/low-pass filter for generating the closed-loop mode version of the attenuated facsimile of the portion of the RF burst signal when the conditioned error signal is at its input, said voltage controlled oscillator generating the simulated burst echo signal during the opened-loop mode of operation of said third means when a conditioned delayed replication of the error signal from said fourth means is at its input; and an RF switch operatively connected at one input to the output of said voltage controlled oscillator, at its other input to said system control logic so as to be switched by the loop mode control signal during the opened-loop mode of operation of said third means, at one output to the other input of said phase detector and at its other output to the one input of said fifth means, said RF switch operating to pass the output of said voltage controlled oscillator to said phase detector when said third means is operating in the closed-loop mode, and said RF switch operating to pass the output of said voltage controlled oscillator to said fifth means when said third means is operating in the opened-loop mode.

5. A shipboard sensor exerciser apparatus according to claim 4 wherein said fourth means comprises:

an analog-to-digital converter operatively connected at one input to the output of said analog switch and at its other input to said system control logic so as to be controlled by the convert pulses, said analog-to-digital converter operating to convert the error signal at the one input into a digital word at its output during both the closed-loop mode and opened-loop mode operations of said third means;

an error storage unit operatively connected at one input to the output of said analog-to-digital converter and at its other inputs to said system control logic such that in response to write-in pulses therefrom, the digital word is written in and stored during the closed-loop mode operation of said third means and the digital word is read out, after a predetermined delay period, to its output; and a digital-to-analog converter operatively connected at one input to the output of said error storage unit and at its other input to said system control logic so as to be controlled by the convert pulses, said digital-to-analog converter operating to convert the digital word at the one input into the delayed replication of the error signal at its output during the opened-loop mode operation of said third means, the output of said digital-to-analog converter being connected to the third input of said analog switch.

* * * * *